B. EITNER.
METHOD OF MAKING CAGES FOR ANTIFRICTION BEARINGS.
APPLICATION FILED DEC. 30, 1908.
1,002,245.
Patented Sept. 5, 1911.
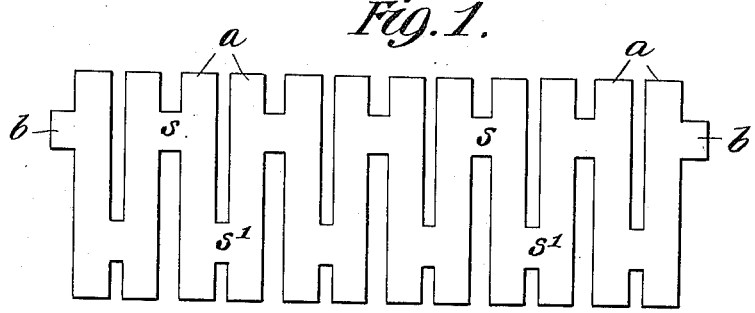
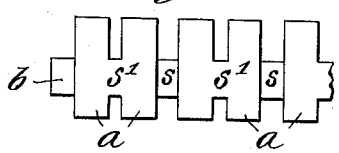
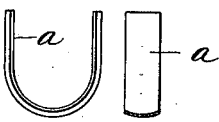
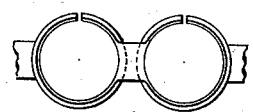
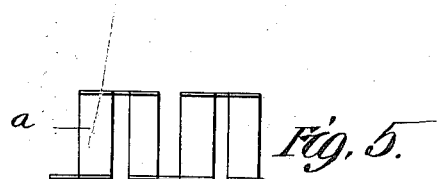
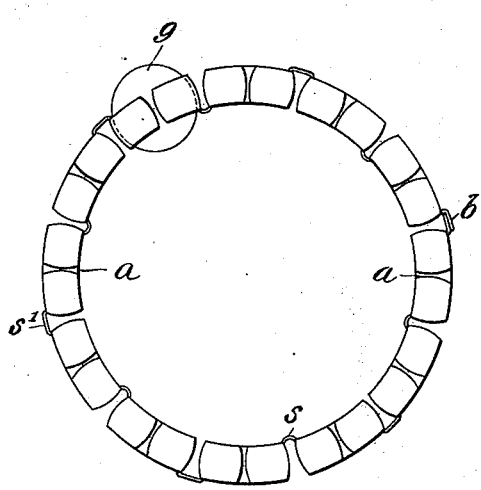
Witnesses:
Inventor
Berthold Eitner
By his Attorneys
Rogers Kennedy

UNITED STATES PATENT OFFICE.

BERTHOLD EITNER, OF BERLIN, GERMANY.

METHOD OF MAKING CAGES FOR ANTIFRICTION-BEARINGS.

1,002,245. Specification of Letters Patent. Patented Sept. 5, 1911.

Application filed December 30, 1908. Serial No. 470,061.

*To all whom it may concern:*

Be it known that I, BERTHOLD EITNER, a subject of the Emperor of Germany, residing at Berlin, in the Empire of Germany, have invented certain new and useful Improvements in Methods of Making Cages for Antifriction-Bearings, of which the following is a specification, reference being had therein to the accompanying drawing.

My invention relates to a method of making cages for anti-friction bearings from a metal strip or similar flat material, which consists broadly of the following steps: First, forming in said material the receptacles for the rolling members, and second, altering its shape to conform substantially to that of the casing elements, so that it may be received between them in the manner well known in the art. More specifically, the strip or similar material is notched or cut into from the opposite sides thereof, so as to divide it into sections, which sections are bent over transversely to the strip and formed as receptacles to adapt themselves to the shape of the balls or other rolling elements, these receptacles being connected to each other in series by transverse portions extending from one receptacle to the next. These transverse portions are then bent or inclined so as to cause the cage to assume circular form, thus conforming it to the shape of the raceway and of the casing elements, between which it is intended to operate.

The strip or similar flat material employed is preferably thin and of a tough and flexible material. The cage constructed therefrom fully meets and satisfies the technical and economical requirements of anti-friction bearings. Not only does it sufficiently surround and hold the balls or other rolling elements against displacement, but affords the maximum amount of exposure of their bearing surfaces. Again, it is simple, cheap, has little weight, and occupies but little space in the bearing. Other advantages residing in this method of construction are that the employment of the strip or other flat material practically dispenses with waste, and that it bends easily and readily, not only when forming the receptacles, but also when caused to assume its circular shape. As illustrated herein, the method is shown as applied to constructing a cage for a radial bearing, but obviously it may be similarly applied to other forms.

Referring to the drawings, Figures 1, 2, 3, 4, 5, 6, and 7, illustrate the different steps and features of my invention as applied in the construction of cages for anti-friction bearings, and will be referred to more in detail in the description which follows.

Referring first to Fig. 1, the strip or similar flat material is shown as notched or cut into from the opposite edges thereof, whereby it is divided into a number of sections $a$, $a$, each of which is designed to form a receptacle for a ball, which is the form of rolling element herein selected by way of example. It will be noted that the cuts or notches are located at opposite points of the strip, thus leaving connecting portions $s$, $s$, and $s^1$, $s^1$, respectively, which connect one section with the next one. It will also be seen, that the cuts or notches between two contiguous sections are of unequal depth, and further that the long and shallow notches are alternated along the sides of the strip, as clearly shown in the said figure. Due to this alternate arrangement, the connecting portions $s$, $s$, and $s^1$, $s^1$, respectively, are located near the opposite edges, all of the connecting portions $s$, $s$, being in line with each other near one edge, and the connecting portions $s^1$, $s^1$, being in line with each other near the other edge. The sections are then bent over transversely, preferably around a longitudinal mandrel, as shown in side view in Fig. 2, and in transverse section in Fig. 3, thus forming a trough-like structure comprising a series of U-shaped sections $a$, connected to each other at opposite sides and alternately by the connecting portions $s$, $s$, and $s^1$, $s^1$, respectively. The sections $a$ are then bent partially to conform to the spherical configuration of the balls, so as to hold the latter in operative position, but at the same time permitting their necessary freedom of movement. This step is preferably accomplished by the use of suitable dies and counter-dies, one of the sections thus shaped being illustrated in Fig. 4. Referring now to Fig. 5, the material is shaped into circular form by bending the connecting portions $s$, $s$, and $s^1$, $s^1$, alternately to the right and left, as clearly illustrated in the figure referred to. The balls may then be inserted in the respective receptacles, after which the ends of the sections or receptacles are bent over them so as to retain them in position, this step being illustrated in Fig. 6. Fig. 7 shows the cage ready for insertion between the casing elements, the balls being located therein, as indicated for instance at $g$. Referring to Fig. 1, it will be noted, that a projecting portion $b$ is left at each end of the strip, which portions $b$ may be employed for the purpose of attaching the two ends to each other in the finished cage, as shown in Fig. 7. If desired, these ends may be united in any manner, as by rivets, solder, and the like, or they may be left disconnected, when it is desired to allow the cage more freedom of play, and the consequent self-adjustment of the rolling members.

Obviously many different modes of carrying the invention into effect are possible, and I desire to be understood that it is not limited to any specific form, except in so far as such limitations are specified in the claims.

Having thus described my invention, what I claim and desire to secure by Letters Patent of the United States is as follows:

1. The method of making a cage for antifriction bearings from a strip or other flat material, consisting of the following steps: first, dividing it into sections by cutting notches in the sides thereof, second, bending the sections transversely to the strip and forming therein receptacles for the rolling members, and third, altering its shape to conform substantially to that of the raceway in the casing elements.

2. The method of making a cage for antifriction bearings from a strip or other flat material, consisting of the following steps: first, dividing it into sections by cutting notches in the sides thereof from opposite points and leaving connecting portions from one section to the next, second, bending the sections transversely to the strip and forming therein receptacles for the rolling members, and third, bending these connecting portions to conform its shape substantially to that of the raceway in the casing elements.

3. The method of making a cage for antifriction bearings from a strip or other flat material, consisting of the following steps: first, dividing it into sections by cutting notches in the sides thereof from opposite points and leaving connecting portions from one section to the next, the opposite notches being of unequal depth, second, bending the sections transversely to the strip and forming therein receptacles for the rolling members, and third, bending these connecting portions to conform its shape substantially to that of the raceway in the casing elements.

4. The method of making a cage for antifriction bearings from a strip or other flat material, consisting of the following steps: first, dividing it into sections by cutting notches in the sides thereof from opposite points, and leaving connecting portions from one section to the next, the opposite notches being of unequal depth and arranged alternately along the respective sides, second, bending the sections transversely to the strip and forming therein receptacles for the rolling members, and third, bending these connecting portions transversely and alternately in opposite directions so as to conform its shape substantially to that of the raceway in the casing elements.

In testimony whereof I have affixed my signature in presence of two witnesses.

BERTHOLD EITNER.

Witnesses:
HENRY HASPER,
WOLDEMAR HAUPT.